(12) United States Patent
Morita et al.

(10) Patent No.: US 7,585,434 B2
(45) Date of Patent: Sep. 8, 2009

(54) CARBONACEOUS MATERIAL FOR FORMING ELECTRICALLY CONDUCTIVE MATERIAL AND USE THEREOF

(75) Inventors: Toshio Morita, Kanagawa (JP); Ryuji Yamamoto, Kanagawa (JP); Masaharu Toki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 671 days.

(21) Appl. No.: 10/540,560

(22) PCT Filed: Dec. 25, 2003

(86) PCT No.: PCT/JP03/16771

§ 371 (c)(1),
(2), (4) Date: Jun. 24, 2005

(87) PCT Pub. No.: WO2004/059663

PCT Pub. Date: Jul. 15, 2004

(65) Prior Publication Data

US 2006/0035081 A1    Feb. 16, 2006

Related U.S. Application Data

(60) Provisional application No. 60/436,631, filed on Dec. 30, 2002.

(30) Foreign Application Priority Data

Dec. 26, 2002  (JP) ............................. 2002-376060

(51) Int. Cl.
*H01B 1/04* (2006.01)
*B32B 9/00* (2006.01)
*H01M 10/24* (2006.01)

(52) U.S. Cl. .................. 252/502; 252/500; 252/511; 252/182.1; 428/366; 428/367; 428/376; 423/447.1; 423/447.3; 423/449.4; 429/231.8; 524/495; 524/496

(58) Field of Classification Search ................. 252/505, 252/511; 524/495, 496; 423/447.1, 445 R; 428/364, 366, 367, 376, 398; 429/231.8
See application file for complete search history.

(56) References Cited

U.S. PATENT DOCUMENTS

| | | | |
|---|---|---|---|
| 4,572,813 A | | 2/1986 | Arakawa |
| 6,103,373 A | * | 8/2000 | Nishimura et al. ........... 428/368 |
| 6,384,128 B1 | * | 5/2002 | Wadahara et al. ............ 524/496 |
| 6,489,026 B1 | * | 12/2002 | Nishimura et al. .......... 428/367 |
| 6,627,689 B2 | * | 9/2003 | Iino et al. .................... 524/404 |
| 7,122,132 B2 | * | 10/2006 | Morita et al. ................ 252/502 |
| 2002/0051903 A1 | * | 5/2002 | Masuko et al. ................ 429/44 |
| 2002/0183438 A1 | * | 12/2002 | Amarasekera et al. ...... 524/495 |
| 2005/0112441 A1 | * | 5/2005 | Iino et al. ...................... 429/34 |

FOREIGN PATENT DOCUMENTS

| | | | |
|---|---|---|---|
| CN | 1343269 A | | 4/2002 |
| JP | 60-27700 A | | 2/1985 |
| JP | 61-218669 A | | 9/1986 |
| JP | 02-077442 | * | 3/1990 |
| JP | 2-77442 A | | 3/1990 |
| JP | 06-122785 | * | 5/1994 |
| JP | 6-122785 A | | 5/1994 |
| JP | 8-60444 A | | 3/1996 |
| JP | 2778434 B2 | | 5/1998 |
| JP | 2001-200211 A | | 7/2001 |
| JP | WO 02/49412 | * | 6/2002 |
| JP | 2002-266170 A | | 9/2002 |
| WO | WO 02/49412 A1 | | 6/2002 |

OTHER PUBLICATIONS

Patent Abstracts of Japan, vol. 014, No. 265 (C-0726), Jun. 8, 1990, abstracting JP 02077442 A (Showa Denko KK), Mar. 16, 1990.

* cited by examiner

*Primary Examiner*—Stanley Silverman
*Assistant Examiner*—Kallambella Vijayakumar
(74) *Attorney, Agent, or Firm*—Sughrue Mion, PLLC

(57) ABSTRACT

(1) A carbonaceous material for forming an electrically conductive composition, comprising a vapor grown carbon fiber, each fiber filament of the carbon fiber having an outer diameter of 2 to 500 nm and an aspect ratio of 10 to 15,000, or the carbon fiber containing boron in an amount of 0.01 to 5 mass %, and graphitic particles and/or amorphous carbon particles, wherein the amount of the vapor grown carbon fiber is 10 to 90 mass %, the amount of the graphitic particles is 0 to 65 mass %, and the amount of the amorphous carbon particles is 0 to 35 mass %;

(2) an electrically conductive composition comprising the carbonaceous material for forming an electrically conductive composition, and a producing method thereof;

(3) an electrically conductive coating material comprising, as an electrically conductive material, the electrically conductive composition, and an electrically conductive coating film and electric device using the electrically conductive coating material.

20 Claims, No Drawings

CARBONACEOUS MATERIAL FOR FORMING ELECTRICALLY CONDUCTIVE MATERIAL AND USE THEREOF

CROSS REFERENCE TO THE RELATED APPLICATIONS

This is an application filed pursuant to 35 U.S.C. Section 111(a) with claiming the benefit of U.S. Provisional application Ser. No. 60/436,631 filed Dec. 30, 2002 under the provision of 35 U.S.C. Section 111(b), pursuant to 35 U.S.C. Section 119(e) (1).

TECHNICAL FIELD

The present invention relates to an electrically conductive composition which is used in electronic materials, which is employed, as a wiring material or a material for connecting devices, in a variety of industrial products including integrated circuits, electronic parts, optical parts and various control parts, or as an antistatic material or an electromagnetic wave shielding material in a variety of devices, and for antistatic coating and the like; to an electrically conductive coating material containing the composition; and to an electrically conductive adhesive containing the composition.

BACKGROUND ART

An electrically conductive coating material or an electrically conductive adhesive is in the form of, for example, an electrically conductive paste product. Depending on the use, the electrically conductive paste product can be classified into an electrically conductive paste in the narrow sense and a resistor paste. The present invention relates to electrically conductive paste in the general meaning including a resistor paste.

An electrically conductive paste predominantly contains an electrically conductive material, an auxiliary agent, a resin serving as a binder or a matrix material and a solvent, and is produced by dispersing fine particles of the electrically conductive material and the auxiliary agent into a varnish obtained by dissolving the resin in the solvent. Dispersion of the electrically conductive material and the auxiliary agent is performed by use of a dispersion mixing machine, a pulverizer or a mill such as a three roll mill, a ball mill, a paint shaker or a planetary mill. Depending on the temperature required for thermal treatment after application, the electrically conductive paste is classified into a paste which is cured through drying (hereinafter may be referred to as a "drying-cured paste") and a paste which is cured through baking (hereinafter may be referred to as a "baking-cured paste").

A drying-cured paste is thermally treated at a temperature falling within a range of ambient temperature to about 250° C., to thereby form a composite product containing the electrically conductive material, the auxiliary agent and the resin component. When the resin to be employed in the drying-cured paste is appropriately chosen, characteristics such as solvent resistance, thermal resistance, adhesion and flexibility can be imparted to the paste. Typical examples of the resin employed in this type of paste include phenolic resin, epoxy resin, polyester resin, silicone resin, acrylic resin and polypropylene resin. When a baking-cured paste is thermally treated at a temperature of about 400° C. to about 1,300° C., the organic component of the applied paste is burned out and the inorganic component remains in the thus-treated paste. The resin employed in the baking-cured paste is chosen in consideration of behavior of the resin during the course of application or thermal treatment of the paste. Examples of the resin employed in this type of paste include cellulose resins such as nitrocellulose and ethyl cellulose, acrylic resin and butyral resin.

In order to improve fluidity of the paste during the course of application and to improve the strength and tribological characteristics of a coating film formed through application of the paste, a dispersant or a thickener is employed as the auxiliary agent. Examples of the auxiliary agent employed include silicon oxide and alumina.

The solvent must be chosen in consideration of the solubility of the resin in the solvent, the fluidity of the solvent required for dispersing the electrically conductive material therein, the volatility of the solvent during the course of thermal treatment of the paste performed after application, and characteristics of a coating film formed after volatilization of the solvent. Examples of the solvent employed include methyl ethyl ketone, N-methylpyrrolidone, terpene compounds such as terpineol, glycol ethers and glycol esters.

Application of such an electrically conductive paste is performed by means of screen printing, the dispenser method, dipping, the transfer method, the applicator method, brush application or spraying. When the paste is applied to a substrate or an electronic element, generally, screen printing, dipping or the transfer method is employed. The viscosity, etc. of the electrically conductive paste must be regulated depending on the application method to be employed.

As the electrically conductive material, there are employed fine particles of a noble metal or a noble metal alloy such as gold, platinum, palladium, silver, a silver-platinum alloy or a silver-palladium alloy, or fine particles of a base metal such as copper, nickel, aluminum or tungsten. Alternatively, there are employed fine particles of an electrically conductive non-metallic material such as carbon, graphite, carbon black, ruthenium oxide, tin oxide or tantalum oxide.

However, the electrically conductive paste containing metal serving as the electrically conductive material involves the following problems: electrical conductivity is lowered with passage of time through, for example, oxidation or corrosion of the metal; an electrically conductive coating film formed of the conductive paste is exfoliated from an electric circuit board because of deformation of the circuit board; and the conductive paste is expensive when the metal is silver. Meanwhile, the carbon-containing electrically conductive material involves problems in that, for example, its electrical conductivity is insufficient, although the conductive material exhibits resistance against, for example, oxidation and corrosion, and is advantageous from the economical viewpoint.

Recently, there have been proposed an electrically conductive coating material containing vapor grown carbon fiber, carbon black and a thermoplastic resin and/or a thermosetting resin (see, for example, Japanese Patent Application Laid-Open (kokai) No. 6-122785); an electrically conductive coating material containing boron-containing fine carbon fiber, and a thermoplastic resin or a thermosetting resin (see, for example, Japanese Patent Application Laid-Open (kokai) No. 2001-200211); and a coating material or an adhesive containing carbon fiber which is readily graphitized, (see, for example, Japanese Patent Application Laid-Open (kokai) No. 61-218669).

In general, an electrically conductive coating material or an electrically conductive adhesive incorporates, as an electrically conductive material, fine particles of a noble metal such as silver, gold or platinum, fine particles of a base metal such as copper or nickel, or fine particles of carbon. In contrast, the three patent publications mentioned above propose a technique in which an electrically conductive composition containing a resin component and carbon fiber is employed, to thereby provide an electrically conductive coating material or an electrically conductive adhesive, which exhibits improved characteristics (e.g., electrical conductivity and durability).

However, in the technique proposed in any of the above publications, a large amount of carbon fiber must be added to the resin component in order to obtain sufficient electrical conductivity. As a result, a mixture of the carbon fiber and the resin component exhibits lowered fluidity. Meanwhile, when only graphitized carbon fiber is employed as an electrically conductive component, the resultant electrically conductive composition incurs resistance anisotropy.

DISCLOSURE OF THE INVENTION

Objects of the present invention are to provide an electrically conductive coating material or an electrically conductive adhesive, which contains an electrically conductive composition exhibiting improved electrical conductivity, migration prevention, oxidation resistance, stability over years (hereinafter may be referred to as "long-term stability") and tribological characteristics; and to provide a coating film (electrically conductive product) using the coating material or the adhesive and exhibiting low resistance anisotropy.

The electrically conductive coating material or electrically conductive adhesive of the present invention exhibits excellent thermal conductivity in addition to electrical conductivity, and thus provides a material endowed with heat dissipation property.

In order to solve the aforementioned problems, the present inventors have developed a carbonaceous material for forming an electrically conductive composition, which contains, as an electrically conductive material, vapor grown carbon fiber and graphitic particles and/or amorphous carbon particles; an electrically conductive composition containing the carbonaceous material; and an electrically conductive coating material or an electrically conductive adhesive, which contains the composition.

The present inventors have also developed a carbonaceous material for forming an electrically conductive composition, which is a mixture of vapor grown carbon fiber containing boron in an amount of 0.01 to 5 mass % and graphitic particles and/or amorphous carbon particles, wherein the amount of the carbon fiber is 20 mass % or more; an electrically conductive composition containing the carbonaceous material; and an electrically conductive coating material or an electrically conductive adhesive, which contains the composition.

The present inventors have also found that the electrically conductive coating material or electrically conductive adhesive of the present invention enables to provide a material endowed with heat dissipation property, which exhibits excellent thermal conductivity in addition to electrical conductivity.

The electrically conductive coating material can assume the form of a liquid, paste-like, or powdery product. When the conductive coating material which has a fluid form including a liquid, a melt and an air-borne suspension is spread on the surface of an object, a thin film is formed on the surface, and, with passage of time, the thin film adheres to the surface and becomes a solid film (coating film), to thereby attain continuous coverage of the surface.

In order to solve the aforementioned problems, the present invention provides the following.

1. A carbonaceous material for forming an electrically conductive composition, comprising a vapor grown carbon fiber, each fiber filament of the carbon fiber containing a hollow space along the filament in its interior and having a multi-layer structure, an outer diameter of 2 to 500 nm and an aspect ratio of 10 to 15,000, and graphitic particles and/or amorphous carbon particles, wherein the amount of the vapor grown carbon fiber is 10 to 90 mass %, the amount of the graphitic particles is 0 to 65 mass %, and the amount of the amorphous carbon particles is 0 to 35 mass %.

2. The carbonaceous material for forming an electrically conductive composition as described in 1 above, wherein the vapor grown carbon fiber is the carbon fiber containing boron in an amount of 0.01 to 5 mass %, and the amount of the carbon fiber in the carbonaceous material is at least 20 mass %.

3. The carbonaceous material for forming an electrically conductive composition as described in 1 above, wherein the vapor grown carbon fiber contains a branched, vapor grown carbon fiber.

4. The carbonaceous material for forming an electrically conductive composition as described in 1 above, wherein the vapor grown carbon fiber contains a nodular, vapor grown carbon fiber.

5. The carbonaceous material for forming an electrically conductive composition as described in 1 above, wherein the graphitic particles or the amorphous carbon particles have an average particle size of 0.1 to 100 µm.

6. The carbonaceous material for forming an electrically conductive composition as described in 1 above, wherein the graphitic particles or the amorphous carbon particles have been thermally treated at 2,000° C. or higher.

7. The carbonaceous material for forming an electrically conductive composition as described in 1 above, wherein the graphitic particles contain boron.

8. The carbonaceous material for forming an electrically conductive composition as described in 1 above, wherein the amorphous carbon particles contain boron.

9. The carbonaceous material for forming an electrically conductive composition as described in 1 or 8 above, wherein the amorphous carbon particles are formed of carbon black or glassy carbon.

10. The carbonaceous material for forming an electrically conductive composition as described in 9 above, wherein the carbon black is at least one species selected from the group consisting of oil furnace black, gas black, acetylene black, lamp black, thermal black, channel black and Ketjenblack.

11. The carbonaceous material for forming an electrically conductive composition as described in 1 above, comprising a vapor grown carbon fiber, each fiber filament of the carbon fiber containing a hollow space along the filament in its interior and having a multi-layer structure, an outer diameter of 2 to 500 nm and an aspect ratio of 10 to 15,000, and graphitic particles, and at least one of the carbon fiber and graphitic particles contains boron, wherein the amount of the vapor grown carbon fiber is 35 to 93 mass % and the amount of the graphitic particles is 7 to 65 mass %.

12. The carbonaceous material for forming an electrically conductive composition as described in 1 above, comprising a vapor grown carbon fiber, each fiber filament of the carbon fiber containing a hollow space along the filament in its interior and having a multi-layer structure, an outer diameter of 2 to 500 nm and an aspect ratio of 10 to 15,000, and amorphous carbon particles, and at least one of the carbon fiber and amorphous carbon particles contains boron, wherein the amount of the vapor grown carbon fiber is 65 to 93 mass % and the amount of the amorphous carbon particles is 7 to 35 mass %.

13. The electrically conductive composition comprising an carbonaceous material as recited in any of 1 to 12 above and a resin component serving as a binder or a matrix material, and, if desired, a solvent.
14. The electrically conductive composition as described in 13 above, wherein, when "a mass %", "b mass %" and "c mass %" represent the amounts of the vapor grown carbon fiber, the graphitic particles and the amorphous carbon particles contained in the composition, with the proviso that the solvent being excluded from the composition, respectively, a, b and c satisfy the following relations:

$5 \leq a+b+c \leq 80, 1 \leq a \leq 60, 1 \leq b \leq 60,$ and $1 \leq c \leq 30.$ 15. A method for producing an electrically conductive composition characterized by adding a resin component and, if desired, a solvent to the carbonaceous material for forming an electrically conductive composition as recited in any of 1 to 12 above, and kneading the resultant mixture.
16. An electrically conductive coating material characterized by comprising, as an electrically conductive material, an electrically-conductive composition as recited in 13 or 14 above.
17. The electrically conductive coating material as described in 16 above, which is employed as an electrically conductive paste.
18. An electrically conductive adhesive characterized by comprising an electrically conductive composition as recited in 13 or 14 above.
19. An electrically conductive coating film characterized by being formed by use of an electrically conductive coating material as recited in 18 above.
20. An electronic part characterized by being formed by use of an electrically conductive coating material as recited in 16 above and/or an electrically conductive adhesive as recited in 18 above.

The present invention will next be described in detail.

Vapor Grown Carbon Fiber

In the late 1980's, studies were performed on vapor grown carbon fiber. Carbon fiber, each fiber filament of the fiber having a diameter of several nm to 1,000 nm inclusive, is known to be produced through thermal decomposition of a gas of, for example, hydrocarbon in a vapor phase in the presence of a metallic catalyst.

A variety of processes for producing vapor grown carbon fiber are disclosed, including a process in which an organic compound such as benzene, serving as a raw material, and an organo-transition metallic compound such as ferrocene, serving as a catalyst, are brought into a high-temperature reaction furnace together with a carrier gas, to thereby produce vapor grown carbon fiber on a substrate (Japanese Patent No. 1784726); a process in which vapor grown carbon fiber is produced in a floating state (U.S. Pat. No. 4,572,813); and a process in which vapor grown carbon fiber is produced on a reaction furnace wall (Japanese Patent No. 2778434). Vapor grown carbon fiber produced through any of the above processes is thermally treated in an inert atmosphere (e.g., argon) at 600 to 1,500° C., and further thermally treated at 2,000 to 3,300° C., to thereby obtain a graphitized carbon fiber (Japanese Patent Application Laid-Open (kokai) No. 8-60444).

Through the aforementioned producing methods, there can be produced carbon fiber of relatively small diameter and high aspect ratio which exhibits excellent electrical conductivity and thermal conductivity, and is suitable as a filler material. Therefore, carbon fiber, each fiber filament of the fiber having a diameter of about 2 to about 500 nm and an aspect ratio of about 10 to about 15,000, is mass-produced and is employed, for example, as an electrically or thermally conductive filler material in electrically conductive resin or as an additive in lead storage batteries.

A characteristic feature of a vapor grown carbon fiber filament resides in its shape and crystal structure. The filament has a structure including a very thin hollow space extending along the filament in its center portion, and a plurality of carbon hexagonal network layers grown around the hollow space so as to form concentric rings. The vapor grown carbon fiber employed in the present invention may be, for example, branched vapor-grown carbon fiber disclosed in Japanese Patent Application Laid-Open (kokai) No. 2002-266170, or vapor grown carbon fiber having a nodular portion, in which the diameter of each fiber filament of the carbon fiber differs from portion to portion.

Boron-containing Carbon Fiber

The electrical conductivity of the carbon fiber can be enhanced by improving the crystallinity (graphitization degree) of the carbon fiber by use of various graphitization catalysts on the vapor grown carbon fiber as described above. For example, when the vapor grown carbon fiber is graphitized by use of boron and/or a boron compound, serving as a graphitization catalyst, the resultant vapor grown carbon fiber (boron-containing carbon fiber), which contains boron, or boron and the boron compound, exhibits electrical conductivity higher than that of general vapor grown carbon fiber.

"As-produced" vapor grown carbon fiber serves as a carbonaceous material having high electrical conductivity, and an electrically conductive composition containing the carbon fiber exhibits high mechanical strength. However, as-produced vapor grown carbon fiber may have, on its surface, for example, a hydrocarbon (i.e., a raw material of the carbon fiber) and products formed through thermal decomposition of the hydrocarbon, and the carbon fiber exhibits insufficient crystallinity in many cases. When such as-produced carbon fiber is thermally treated in an inert atmosphere at 2,000° C., preferably at 2,300° C. or higher, thermal decomposition products adhering to the carbon fiber are volatalized and removed therefrom, and crystallization (graphitization) of the carbon fiber proceeds, whereby the electrical conductivity of the carbon fiber can be enhanced. When the crystallinity of the carbon fiber is enhanced, the electrical conductivity thereof is also enhanced. Thermally treating the carbon fiber in the presence of boron is particularly preferred, since graphitization of the carbon fiber is further promoted.

Boron-containing vapor grown carbon fiber (boron-containing carbon fiber) is produced through the following procedure: the aforementioned vapor grown carbon fiber; branched vapor grown carbon fiber; or nodular vapor grown carbon fiber is thermally treated by means of, for example, the method disclosed in International Publication WO/00/58536 in an inert atmosphere (e.g., argon) at 2,000 to 3,300° C. in the presence of boron or a boron compound such as boric acid, a borate, boron oxide or boron carbide.

As the raw material of the boron-containing carbon fiber, there is employed fine vapor grown carbon fiber of low crystallinity which has been thermally treated at a low temperature and which is readily doped with boron; for example, vapor grown carbon fiber which has been thermally treated at 1,500° C. or lower. Preferably, as-produced (as-grown) vapor grown carbon fiber which has not undergone thermal treatment is used. Even carbon fiber of low crystallinity which has not undergone thermal treatment is heated up to the graphitization temperature during the course of treatment employing a boron catalyst (boronization) and thus can be employed as the raw material. The raw material of the boron-containing carbon fiber may be carbon fiber which has been graphitized at 2,000° C. or higher, at which general thermal treatment is performed. However, from the viewpoint of energy efficiency, it is preferable to employ the carbon fiber which has not undergone thermal treatment and not been graphitized in advance, or which has been thermally treated at a temperature of 1500° C. or lower, so that boron exhibits its catalytic effect.

The raw material of the boron-containing carbon fiber may be pulverized or milled in advance, in order to improve its handling. However, a filler formation treatment such as pulverization, milling or classification will eventually be performed as a final step after the raw material carbon fiber and boron or a boron compound are thermally treated without directly mixing with each other but in separate containers, and thereby the vapor of the boron or boron compound is generated and reacted with the carbon fiber. Therefore, the length of the raw material carbon fiber is not necessarily required to be regulated to a length suitable for providing, for example, a filler before thermal treatment of the carbon fiber. Carbon fiber which is generally produced through a vapor growth process, each fiber filament of the carbon fiber having a diameter of about 2 to about 1,000 nm and a length of about 500 to about 400,000 nm, may be employed as the raw material carbon fiber without any treatment.

Since thermal treatment is performed at a temperature of 2,000° C. or higher, the boron compound to be employed must be a substance that is not evaporated through, for example, decomposition before the thermal treatment temperature reaches 2,000° C. Examples of the boron compound to be employed include elemental boron; boron oxides such as $B_2O_2$, $B_2O_3$, $B_4O_3$ and $B_4O_5$; oxo acids of boron such as orthoboric acid, metaboric acid and tetraboric acid, and salts of boric acids; boron carbides such as $B_4C$ and $B_6C$; and BN. Boron carbides such as $B_4C$ and $B_6C$ and elemental boron are preferred.

The methods for doping carbon fiber with boron include a method wherein the raw material, i.e., solid boron or a boron compound is added directly to or mixed with carbon fiber; and a method wherein the carbon fiber is not directly contacted with the raw material, i.e., boron or a boron compound but with the vapor generated by heating boron or a boron compound; and the latter is preferable.

The doping amount of boron is generally 0.01 mass % to 5 mass % on the basis of the entire amount of carbon fiber. Therefore, when a boron compound or boron in vapor is provided with carbon fiber such that they are not brought into direct contact with each other, in consideration of conversion rate, the amount of the boron or boron compound to be provided is regulated to 5 mass % or more as reduced to atomic boron on the basis of the entire amount of carbon. When the amount of boron to be employed is small, the effect of boron is insufficiently obtained.

In the case where boron or a boron compound is added directly to or mixed with carbon fiber, during the course of thermal treatment, an excess amount of the boron or boron compound tends to be melted and sintered, and then solidifies on the carbon fiber or covers the surface of the carbon fiber, whereby characteristics of the carbon fiber required for forming a filler may be deteriorated (for example, the electrical resistance of the carbon fiber increases). Particularly when a transition metallic compound, which is formed into a catalyst seed to be employed during the course of production of carbon fiber, or a metallic component derived from the compound readily reacts with boron, to thereby form a boride (metal boride), which is liquefied in crystals of the carbon fiber or on the surface of the carbon fiber, preferably, the carbon fiber is not brought into contact with boron or the boron compound.

Such fine carbon fiber as the raw material of the boron-containing carbon fiber has a three-dimensional structure, tends to form a flock, and has very low bulk density and very high porosity. In addition, since the amount of boron to be added to the raw material carbon fiber is very small, it is difficult to bring boron and the carbon fiber into contact with each other uniformly by merely mixing them. As a result, the added boron is difficult to exhibit its catalytic effect throughout the carbon fiber uniformly.

In order to efficiently introduce boron into the raw material carbon fiber, the carbon fiber and boron or the boron compound must be sufficiently mixed together, to thereby bring the carbon fiber into contact with boron or the boron compound as uniformly as possible. In order to attain such uniform contact, preferably, boron or a boron compound having a possibly minimum particle size are employed. The method where the carbon fiber is not brought into contact with solid boron or the solid boron compound is preferable, as no particular limitations are imposed on the size of the carbon fiber, and even when the carbon fiber has a large size, a portion containing boron of high concentration is not formed on the carbon fiber, and formation of solidified mass of boron tends not to occur.

In general, fine carbon fiber produced through a vapor phase process has low bulk density. For example, an as-produced fine carbon fiber aggregate has a bulk density of about 0.01 g/cm$^3$ or less, and even when the aggregate is subjected to thermal treatment, pulverization, milling and classification, the resultant product has a bulk density of about 0.02 to about 0.08 g/cm$^3$. For the thermal treatment of the carbon fiber having such high porosity, a thermal treatment furnace of very large capacity is required, leading to high equipment cost and low productivity. Therefore, an efficient process is required for introducing boron into such fine carbon fiber.

In order to efficiently introduce boron into carbon fiber, the concentration of boron present around the carbon fiber must be sufficiently maintained. Accordingly, direct contact of the carbon fiber with boron may be desired but when an excess amount of the boride resulted from the reaction of boron with a metallic catalyst (e.g., iron or cobalt) employed for producing vapor grown carbon fiber remains in the resultant carbon fiber and may cause any inconvenience, direct contact between the carbon fiber and boron must be prevented, and uniform distribution of the boron concentration must be achieved during the course of thermal treatment of the carbon fiber.

Thus, in order to prevent direct contact between the carbon fiber and boron or a boron compound, which are in the form of solid, before thermal treatment, the carbon fiber and boron or the boron compound may be placed in separate containers (e.g., crucibles), for example, or boron or the boron compound may be wrapped with carbon fiber cloth, to thereby make them coexist, followed by thermal treatment of the carbon fiber. Preferably, thermal treatment is carried out after the carbon fiber is densified, so that the density of the carbon fiber is maintained as high as possible. In a preferred method for attaining such densification, before thermal treatment, a container containing the boron or boron compound is placed into a container filled with the carbon fiber, and subsequently pressure is applied to the carbon-fiber containing container so as to compress the container, thereby densifying the carbon fiber and maintaining the density of the carbon fiber at a high level.

The methods to increase the density of a mixture of carbon fiber and boron or a boron compound, and maintain the density of the mixture at high level includes the following methods: a shaping method; a granulation method; and a method in which a mixture of the carbon fiber and boron or the boron compound is placed into a crucible, and the mixture is compressed into a compact of predetermined shape. In the case where the shaping method is employed, the resultant shaped product may assume any shape selected from among a columnar shape, a plate-like shape and a rectangular parallelepiped shape.

When the mixture of the carbon fiber and boron or the boron compound is compressed to thereby form a compact and then pressure applied to the mixture is released, the volume of the compact may increase to some extent, whereby the bulk density of the compact may decrease. In such a case, the bulk density of the compact during the course of compression is regulated such that the bulk density of the compact after release of the applied pressure becomes 0.03 g/cm$^3$ or more. In the case where the carbon fiber is placed in a container, in order to enhance treatment efficiency, the carbon fiber may be compressed by use of, for example, a pressurizing plate so as to attain a bulk density of 0.03 g/cm$^3$ or more. Alternatively, while being compressed, the carbon fiber may be subjected to thermal treatment.

The thermal treatment temperature required for introducing boron into carbon crystals is 2,000° C. or higher, preferably 2,300° C. or higher. When the treatment temperature is below 2,000° C., introduction of boron becomes difficult, because of low reactivity between boron and carbon. In order to further promote introduction of boron, to impose crystallinity of carbon fiber and particularly to regulate the interlayer distance ($d_{002}$) of carbon layers of carbon fiber, each fiber filament of the carbon fiber having a diameter of about 100 nm, to 0.3385 nm or less, the treatment temperature is preferably maintained at 2,300° C. or higher. No particular limitations are imposed on the upper limit of the thermal treatment temperature. However, in consideration of the upper limit of the temperature of an apparatus to be employed, the upper limit of the thermal treatment temperature is about 3,200° C.

No particular limitations are imposed on the thermal treatment furnace to be employed, so long as the furnace can maintain a target temperature of 2,000° C. or higher, preferably 2,300° C. or higher. The thermal treatment furnace may be any of generally employed furnaces such as an Acheson furnace, a resistance furnace and a high-frequency furnace. Thermal treatment may be carried out by applying electricity directly to a powdery or shaped carbon fiber product, to thereby heat the product.

Thermal treatment is carried out in a non-oxidative atmosphere, preferably in an atmosphere containing one or more rare gases selected from argon, helium, neon, etc. From the viewpoint of productivity, the thermal treatment time is preferably shortened to a possibly minimum level. When heat treatment is carried out for a long period of time, sintering of carbon fiber proceeds, resulting in low product yield. Therefore, after the temperature of the center portion of, for example, a shaped carbon fiber product reaches the target temperature, the product is maintained at the target temperature within one hour. Such a maintenance time is sufficient for thermal treatment of carbon fiber.

Amorphous Carbon Particles:

The term "amorphous carbon" refers to a carbon material having a three-dimensional structure in which carbon atoms are irregularly arranged and exhibiting a broad reflection peak when subjected to X-ray diffractometry or electron diffractometry. Examples of the amorphous carbon material include glassy carbon, carbon black, and a carbon material of low crystallinity which has undergone thermal treatment at a low temperature and has neither a three-dimensional regular structure nor a graphite structure.

Among these, carbon black, which is a carbon material containing amorphous carbon in an amount of about 95% or more, being in the form of fine particles whose size is in the order of nm and exhibiting good quality in terms of such features as specific surface area, microstructure, and aggregate distribution, is suitable for use in the present invention.

There have been known various types of carbon black, which are produced from different raw materials by means of different production methods. Examples of the carbon black which is suitable for use in the present invention include oil furnace black, gas black, acetylene black, lamp black, thermal black, channel black and Ketjenblack. Among these, acetylene black, thermal black, channel black and Ketjenblack are preferred.

Preferably, amorphous carbon particles employed in the present invention (for example, carbon black particles), have a well-developed structure; have a small primary particle size, a large secondary particle size and a large surface area; and are porous. The amorphous carbon particles preferably attain an oil absorption of 90 ml(DBP)/100 g or more (according to JIS K 6221-1982 "testing method of carbon black for rubber"). Thus, the carbonaceous material obtained therefrom readily form a microstructure and exhibit higher electrical conductivity.

The particle size of each of the amorphous carbon particles (on the basis of microstructure) is generally 30 to 500 nm, preferably 30 to 100 nm. The specific surface area of the particles is preferably 20 to 50 m$^2$/g by BET method.

The amount of the amorphous carbon particles contained in the carbonaceous material for forming an electrically conductive composition of the present invention is generally 7 to 35 mass %, preferably 10 to 30 mass %.

The amount of the amorphous carbon particles contained in the electrically conductive composition is 1 to 60 mass %, preferably 2 to 30 mass %, more preferably 5 to 20 mass %. When the amount of the amorphous carbon particles is less than 1 mass %, the electrically conductive composition may fail to exhibit sufficient electrical conductivity and low resistance anisotropy, whereas when the amount of the amorphous carbon particles is 60 mass % or more, the amount of the vapor grown carbon fiber or graphitic particles becomes relatively small, or the amount of the resin component becomes small, and thus the composition may fail to exhibit sufficient electrical conductivity.

The amorphous carbon (e.g., carbon black) may be employed without any treatment. Alternatively, as in the case of the vapor grown carbon fiber, the amorphous carbon particles may be employed, which have been thermally treated at a temperature of 2,000° C. or higher (preferably at 2,300° C. or higher), or may be thermally treated in the presence of boron or a boron compound at a temperature of 2,000° C. or higher (preferably at 2,300° C. or higher), to thereby have the crystallization degree not exceeding that of the graphitic particles. The thus thermally treated amorphous carbon particles exhibit electrical conductivity higher than that of amorphous carbon particles which have not undergone thermal treatment. In addition, the thus-treated amorphous carbon particles are envisaged to exhibit preferred effects; for example, the particles can be formed into a product exhibiting enhanced coating strength.

Graphitic Particles:

The graphitic particles employed in the present invention are not necessarily graphitized completely. Specifically, the graphitic particles may be graphitized such that the interplanar spacing $C_0$ (i.e., twice the distance between carbon-network layers ($d_{002}$)) as measured through X-ray diffractometry is about 0.685 nm or less (i.e., $d_{002}$ is 0.3425 nm or less). The theoretical $C_0$ value of completely graphitized graphite is known to be 0.6708 nm (i.e., $d_{002}$ is 0.3354 nm), and the graphitic particles do not have a $C_0$ value lower than this value.

The graphitic particles may be formed of natural graphite or artificial graphite. Alternatively, the graphite particles may be formed through thermal treatment of a carbonaceous raw material.

The raw material of the graphitic particles may be carbonaceous powder such as natural graphite, artificial graphite, coke, mesophase carbon, pitch, wood charcoal or resin charcoal. Of these, preferred examples are natural graphite; artificial graphite; and coke, mesophase carbon and pitch, which are easily graphitized through heating.

When the graphitic particles assume a shape which approximates the sphere, the particles are readily kneaded in a resin. When the graphitic particles formed of mesophase carbon is added to a resin, fluidity of the resin is improved and the resultant resin exhibits excellent moldability.

The graphitic particles and the amorphous carbon particles may be adjusted by pulverization or the like in advance or after thermal treatment to attain a finally required particle size. Preferably, these particles are adjusted in advance so as to have a required particle size.

The graphitic particles and the amorphous carbon particles may be milled by use of, for example, a high-speed rotation mill (a hammer mill, a pin mill or cage mill), a ball mill (a rotation mill, a vibration mill or a planetary mill), or a stirring mill (a beads mill, an attritor, a flow-tube mill or an annular mill). Under certain conditions, an atomizer such as a screen mill, a turbo mill, a super micron mill or a jet mill may be employed.

In consideration of characteristics and productivity, the average particle size of the particles is preferably 0.1 to 100 µm, more preferably 0.1 to 80 µm. The particles are made to contain substantially no particles having a size of 0.5 µm or less and/or substantially no particles having a size of more than 80 µm; i.e., the particles contain particles having such sizes in a total amount of 5 mass % or less, preferably 1 mass % or less.

In a thermal treatment process, at least one species selected from boron, nickel, cobalt, manganese, silicon, magnesium, aluminum, calcium, titanium, vanadium, chromium, iron, copper, molybdenum, tungsten, zirconium and a compound thereof, each species having an average particle size of 0.1 to 100 µm, is added to and mixed with carbonaceous powder (raw material powder) (graphitic particles and amorphous particles) having an average particle size of 0.1 to 100 µm, such that the amount of each species is 0.01 to 10 mass %, preferably 0.1 to 10 mass %; and the resultant mixture is placed in a graphite-made container having a lid (e.g., a crucible). When the amount of the aforementioned compound is less than 0.01 mass %, the effect of the compound is insufficient, whereas when the amount of the compound exceeds 10 mass %, the effect almost saturates and thus further effect commensurate with the increased amount is not obtained, possibly raising problems such as aggregation of the compound powder and the carbonaceous powder.

In order to make an element of interest be present in the graphitic particles in an amount of 100 mass ppm or more after thermal treatment, more effectively, at least one compound powder is added to and mixed with the graphitic particles (for example, when boron is to be present in the graphitic particles, a compound powder such as boron, boron carbide or boron oxide is added to the particles). The reason for the above is as follows: when a mixture of substances having different melting points and boiling points is employed, the problems caused by variation of the temperature in a furnace during the course of thermal treatment can be alleviated.

Thermal treatment is carried out by heating the graphite-made container containing the raw material and the aforementioned compound in an atmosphere of an inert gas such as argon, nitrogen or helium. The furnace employed for thermal treatment may be a general graphitization furnace such as an Acheson furnace or a high-frequency induction heating furnace. The temperature of the thermal treatment is preferably at 2,000° C. or higher and not too high so that the aforementioned added substance or a generated boride is not evaporated and lost. The heating temperature is preferably regulated to about 2,000 to about 2,500° C. During the course of thermal treatment, graphitization of the raw material which has not been graphitized proceeds. In the present invention, the aforementioned added substance effectively serves as a graphitization catalyst. When thermal treatment is carried out at 2,500° C. or higher; for example, at 2,500 to 3,200° C., graphitization of the fine graphitic particles advantageously proceeds. However, in consideration of the material of the thermal treatment apparatus, the upper limit of the thermal treatment temperature is 3,200° C. or thereabout.

In the carbonaceous material for forming an electrically conductive composition of the present invention containing the vapor grown carbon fiber and the graphitic particles and/or amorphous carbon particles, the ratio (mass %) of each component is; the vapor grown carbon fiber: 10 to 90% (preferably 25 to 60%), graphitic particles: 0 to 65% (preferably 0 to 40%) and amorphous carbon particles: 0 to 35% (preferably 0 to 20%).

In the carbonaceous material for forming an electrically conductive composition of the present invention containing the vapor grown carbon fiber and the graphitic particles and without containing the amorphous carbon particles, the ratio of the vapor grown carbon fiber is 35 to 93%, preferably 35 to 60%, and the ratio of the graphitic particles is 7 to 65%, preferably 10 to 40%.

In the carbonaceous material for forming an electrically conductive composition of the present invention containing the vapor grown carbon fiber and the amorphous carbon particles and without containing the graphitic particles, the ratio of the vapor grown carbon fiber is 35 to 93%, preferably 35 to 60%, and the ratio of the amorphous carbon particles is 7 to 35%, preferably 10 to 30%.

When an electrically conductive coating material having a volume resistivity of 0.1 Ωcm or less is required, the carbonaceous material for forming an electrically conductive composition preferably contains boron-containing vapor grown carbon fiber rather than mere vapor grown carbon fiber. In this case, the amount of the boron-containing vapor grown carbon fiber contained in the carbonaceous material is 60 mass % or more, preferably 75 mass % or more, more preferably 80 mass % or more; and the total amount of the amorphous carbon particles and/or the graphitic particles contained in the carbonaceous material is 40 mass % or less, preferably 25 mass % or less, more preferably 20 to 10 mass %.

Since each fiber filament of vapor grown carbon fiber contains a hollow space along the filament, the carbon fiber exhibits excellent thermal conductivity and is suitable for use in, for example, a paste requiring thermal conductivity. When the vapor grown carbon fiber is employed in a coating film, the strength and electrical conductivity of the film are enhanced. When the vapor grown carbon fiber is thermally treated or boron is incorporated into the carbon fiber, the resultant carbon fiber exhibits further imposed crystallinity and electrical conductivity, whereby oxidation resistance of the carbon fiber is improved, and long-term stability is imparted to the carbon fiber.

Even when either the graphitic particles or the amorphous carbon particles are employed, wettability of the electrically conductive composition is enhanced, electrical conductivity anisotropy attributed to the vapor grown carbon fiber is prevented, and a coating film formed from the composition exhibits low kinetic friction coefficient and excellent tribological characteristics.

When the graphitic particles or the amorphous carbon particles (i.e., carbonaceous substance) are subjected to heating treatment or boronization treatment, the resultant particles are envisaged to exhibit enhanced electrical conductivity similarly to those obtained from the vapor grown carbon fiber. Even when either the graphitic particles or the amorphous carbon particles are employed, the above-described effects are obtained. However, when the graphitic particles and the amorphous carbon particles are employed in combination, these particles exhibit effects as described below. The amorphous carbon particles, having an irregular, branched-chain structure, come into contact with the vapor grown carbon fiber, to thereby form an electrical network, whereby electrical conductivity is obtained. In addition, the graphitic particles, which exhibit electrical conductivity higher than that of the amorphous carbon particles, are dispersed in micropores present between fiber filaments of the carbon fiber, and thus the electrical network is further spread, and lowering of electrical conductivity, which is caused by separation of fiber filaments which are in contact with one another, is prevented, whereby electrical conductivity is envisaged to be obtained in a constant manner.

Resin Component:

The electrically conductive composition of the present invention contains a resin component as a binder such as a filler or a matrix. Examples of the resin component which may be employed include thermoplastic resins, thermosetting resins and thermoplastic elastomers.

Examples of the thermoplastic resins include polyethylene (PE), polypropylene (PP), polymethylpentene, polybutene, polybutadiene, polystyrene (PS), styrene butadiene resin (SB), polyvinyl chloride (PVC), polyvinyl acetate (PVAc), polyethyl methacrylate (PMMA, acrylic resin), polyvinylidene chloride (PVDC), polytetrafluoroethylene (PTFE), an ethylene-polytetrafluoroethylene copolymer (ETFE), an ethylene-vinyl acetate copolymer (EVA), AS resin (SAN), ABS resin (ABS), an ionomer (IO), AAS resin (AAS), ACS resin (ACS), polyacetal (POM, polyoxymethylene), polyamide (PA, nylon), polycarbonate (PC), polyphenylene ether (PPE), polyethylene terephthalate (PETP), polybutylene terephthalate (PBTP), polyarylate (PAR, U polymer), polysulfone (PSF), polyether sulfone (PESF), polyimide (PI), polyamideimide (PAI), polyphenylene sulfide (PPS), polyoxybenzoyl (POB), polyether ether ketone (PEEK), polyether imide (PEI), cellulose acetate (CAB) and cellulose acetate butyrate (CAB). Among these, polyethylene, polypropylene, polyvinyl chloride, polyethyl methacrylate, polytetrafluoroethylene and an ethylene-polytetrafluoroethylene copolymer are preferred. These thermoplastic resins may be employed singly or in combination of two or more species.

Examples of the thermosetting resins include phenolic resin (PF), amino-resin, urea resin (UF), melamine resin (MF), benzoguanamine resin, unsaturated polyester (UP), epoxy resin (EP), diallyl phthalate resin (allyl resin) (PDAP), silicone (SI), polyurethane (PUR) and vinyl ester resin. Among these, phenolic resin, unsaturated polyester resin, epoxy resin and vinyl ester resin are preferred. If desired, one or more species of the thermoplastic resins and one or more species of the thermosetting resins may be employed in combination.

Examples of the thermoplastic elastomers include styrene-butadiene elastomer (SBC), polyolefin elastomer (TPO), urethane elastomer (TPU), polyester elastomer (TPEE), polyamide elastomer (TPAE), 1,2-polybutadiene (PB), polyvinyl chloride elastomer (TPVC) and an ionomer (IO). Among these, polyolefin elastomer, polyamide elastomer, polyester elastomer and an ionomer are preferred. If desired, one or more species of the thermoplastic elastomers and one or more species of the thermoplastic or thermosetting resins may be employed in combination.

Composition:

The proportion of the thermoplastic resin, thermosetting resin or thermoplastic elastomer contained in the electrically conductive composition of the present invention is generally 20 to 95 mass %, preferably 40 to 65 mass %. When the amount of the resin component is less than 20 mass %, even if an electrically conductive path is formed from the electrically conductive composition, exfoliation of the conductive path tends to occur, whereas when the amount of the resin component is 95 mass % or more, the electrically conductive composition may fail to exhibit sufficient electrical conductivity.

The electrically conductive composition of the present invention may contain a known additive, so long as the additive does not impede the purposes of the present invention. Examples of the additive include a plasticizer, a stabilizer, a filler, a reinforcing agent, an antioxidant, an ultraviolet absorber, a flame retardant and a lubricant. The additive to be employed is appropriately determined in accordance with use of the electrically conductive composition of the present invention.

The electrically conductive composition of the present invention is produced by mixing the vapor grown carbon fiber, the amorphous carbon particles, the graphitic particles and the resin component. These components may be mixed by use of a known mixer. No particular limitations are imposed on the order of mixing of the components. The electrically conductive composition may be prepared into an electrically conductive coating material or an electrically conductive adhesive by means of a known method.

The electrically conductive composition of the present invention exhibits excellent electrical conductivity. Therefore, the electrically conductive composition can be formed into an electrically conductive coating material or an electrically conductive ink. Since the electrically conductive composition of the present invention contains the resin component serving as a matrix, the composition exhibits moldability. When the electrically conductive composition is appropriately molded into a product, the thus-molded product can be employed in, for example, a low-resistance band for a facsimile electrode plate, etc., an antistatic conveyer belt, a medical rubber product, an electrically conductive tire, an IC accommodating case, a copying or spinning roll, an elastic electrode, a heating element, an element for prevention of overcurrent or overheat, an electromagnetic wave shielding material, a keyboard switch, a connector element and a switching element.

The solvent used for a composition of the present invention may be a solvent which is generally employed in an electrically conductive coating material or an electrically conductive adhesive. Examples of the solvent which may be employed include methyl ethyl ketone, N-methylpyrrolidone, a terpene compound such as terpineol, glycol ether and glycol ester.

A solvent exhibiting good solubility with respect to the resin component to be employed is selected from the aforementioned solvents. These solvents may be employed singly or in combination of two or more species. No particular limitations are imposed on the amount of the solvent to be employed, and a necessary amount of the solvent is the amount that is generally required for producing a coating material or an adhesive.

In order to enhance fluidity of the conductive composition during the course of application, and the strength and tribological characteristics of a coating film formed through application of the composition, the composition may contain an auxiliary agent (e.g., a dispersant or a thickener) which is generally employed in an electrically conductive coating material. Dispersion of the electrically conductive material, etc. into a varnish may be carried out by means of a method which is generally employed for preparing an electrically conductive coating material.

The incorporation amounts of the auxiliary agent and resin employed in the present invention vary with the characteristics of the resin, and are determined in accordance with characteristics (e.g., electrical conductivity, viscosity and fluidity) required for the resultant electrically conductive coating material or electrically conductive adhesive.

When "a mass %", "b mass %" and "c mass %" represent the amounts of the vapor grown carbon fiber, the graphitic particles and the amorphous carbon particles contained in the electrically conductive composition of the present invention, with the proviso that the solvent being excluded from the composition, respectively, a, b and c preferably satisfy the following relations:

$$5 \leq a+b+c \leq 80, 1 \leq a \leq 60, 1 \leq b \leq 60, \text{ and } 1 \leq c \leq 30.$$

In order to enhance the volume resistivity of the electrically conductive composition, the vapor grown carbon fiber preferably contains boron-containing vapor grown carbon fiber. The boron-containing vapor grown carbon fiber is carbon fiber of high electrical conductivity. In order to efficiently form an electrically conductive path, the boron-containing vapor grown carbon fiber is incorporated into the electrically conductive composition in an amount of preferably 10 to 60 mass %, more preferably 20 to 60 mass %, on the basis of the entirety of the composition, with the proviso that the solvent being excluded from the composition.

When a mixture of the vapor grown carbon fiber and the graphitic particles or a mixture of the vapor grown carbon fiber and the amorphous carbon particles is employed, the vapor grown carbon fiber is preferably a vapor grown carbon fiber containing boron in an amount of 0.01 to 5 mass %, each fiber filament of the carbon fiber containing a hollow space along the filament in its interior, and having a multi-layer structure, an outer diameter of 2 to 500 nm and an aspect ratio of 10 to 15,000. The amount of the boron-containing vapor grown carbon fiber contained in the electrically conductive composition is preferably 20 mass % or more, more preferably 25 to 60 mass %, much more preferably 30 to 50 mass %.

When the amount of the vapor grown carbon fiber is less than 20 mass %, an electrically conductive path is not formed by the vapor grown carbon fiber, and an aimed electrical conductivity fails to be obtained.

Use:

No particular limitations are imposed on the object to which the electrically conductive coating material or the electrically conductive adhesive is applied, so long as the resultant coating film requires electrical conductivity. In particular, the electrically conductive coating material is suitable for use in production of an electric circuit board such as a printed wiring board.

The thus-produced electric circuit board is employed in a variety of products; for example, household electrical appliances, industrial products, vehicles, communication information products, airplanes and ships, products employed in the cosmic space, weapons, clocks, cameras and toys.

Depending on use of the electric circuit board, the electric circuit for wiring formed from the electrically conductive coating material or the electrically conductive ink may be provided on one surface or both surfaces of the board. The electric circuit board is produced through, for example, the following procedure: the electrically conductive coating material is applied onto a substrate through printing or coating; and if desired, the coating material is cured by means of heat or an electron beam, or the coating material is dried for removing the solvent. The thickness of a coating film formed from the electrically conductive coating material is generally 5 to 100 μm.

BEST MODE FOR CARRYING OUT THE INVENTION

The present invention will next be described in more detail with reference to representative examples, which should not be construed as limiting the invention thereto.

Production of Vapor Grown Carbon Fiber:

Vapor grown carbon fiber, fiber filaments of the carbon fiber having an average diameter of 150 nm and an average length of 20 μm, was produced by means of the method described in Japanese Patent Publication No. 2778443. The thus-produced carbon fiber was thermally treated in an argon atmosphere at 1,000° C., and then graphitized at 2,800° C. (hereinafter, the resultant vapor grown carbon fiber will be called "VGCF(150)").

In a manner similar to that described above, vapor grown carbon fiber, fiber filaments of the carbon fiber having an average diameter of 80 nm and an average length of 20 μm, was produced. The thus-produced carbon fiber was thermally treated in an argon atmosphere at 1,000° C., and then graphitized at 2,800° C. (hereinafter, the resultant vapor grown carbon fiber will be called "VGCF(80)").

Production of VGCF-B:

Vapor grown carbon fiber, fiber filaments of the carbon fiber having an average diameter of 150 nm and an average length of 20 μm, was thermally treated in an argon atmosphere at 1,000° C. Subsequently, boron carbide (2 mass %) was added to the carbon fiber, followed by graphitization at 2,800° C. (hereinafter, the resultant vapor grown carbon fiber will be called "VGCF-B(150)").

Vapor grown carbon fiber, fiber filaments of the carbon fiber having an average diameter of 80 nm and an average length of 20 μm, was thermally treated in an argon atmosphere at 1,000° C. Subsequently, boron carbide (2 mass %) was added to the carbon fiber, followed by graphitization at 2,800° C. (hereinafter, the resultant vapor grown carbon fiber will be called "VGCF-B(80)").

Production of CB-H:

Carbon black CB(K) (Ketjenblack EC, product of Akzo) was thermally treated in an argon atmosphere at 2,800° C. (hereinafter, the resultant carbon black will be called "CB-H (K)").

Production of CB-B:

Boron carbide (2 mass %) was added to carbon black (Ketjenblack EC, product of Akzo), followed by thermal treatment in an argon atmosphere at 2,800° C. (hereinafter, the resultant carbon black will be called "CB-B(K)").

Production of Graphitic Particles-B:

Boron carbide whose average particle size had been regulated to 10 μm (2 mass %) was added to UFG10 (artificial graphite fine powder produced by Showa Denko K. K., average particle size: 5 μm), to thereby prepare a mixture sample. The mixture sample was placed in a graphite-made container having a lid, and then thermally treated in an argon atmosphere at 2,800° C. (hereinafter, the resultant graphitic particles will be called "UFG10-B")

EXAMPLE 1

A xylene-modified phenoxy resin serving as a resin component, glycol ether serving as a solvent, graphitic particles (UFG10, artificial graphite fine powder produced by Showa Denko K. K., average particle size: 5 μm) serving as an electrically conductive material, amorphous carbon particles (Ketjenblack EC, product of Akzo) (hereinafter called "CB (K)"), and vapor grown carbon fiber (average diameter of fiber filaments of the carbon fiber: 150 nm, average length of the filaments: 20 μm) (hereinafter called "VGCF(150)") (the amounts of the graphitic particles, amorphous carbon particles and vapor grown carbon fiber are shown in Table 1) were kneaded by use of a three roll mill, to thereby prepare an electrically conductive paste.

The thus-prepared paste was applied through screen printing to an epoxy substrate, to thereby form films (n=5), each having a pattern (width: 4 mm, length: 10 mm), and the thus-patterned films were dried and cured at 200° C. Each of the resultant patterned films was found to have a thickness of 10 μm. The volume resistivity of the patterned film was measured. The average volume resistivity is shown in Table 1.

The adhesiveness of the coating film was evaluated according to JIS K 5400-1900 "cross-cut adhesion method". The thus-prepared paste was applied through screen printing to an epoxy substrate, to thereby form films, each having a pattern (width: 60 mm, length: 60 mm), and the thus-patterned films were dried and cured at 200° C. Each of the resultant patterned films was found to have a thickness of 10 μm. The adhesiveness of the coating film was evaluated according to a cross-cut adhesion test method (the number of grids=100). The status of the scratches made on the coating film was observed and rated on a 4-point scale; grade 10 or 8 as the mark ◎, grade 6 or 4 as ○, grade 2 as Δ and grade 0 as ×. The results of the evaluation are shown in Tables 1 and 2.

EXAMPLES 2 THROUGH 12 AND COMPARATIVE EXAMPLES 1 THROUGH 5

In a manner similar to that of Example 1, an electrically conductive paste was prepared from the materials shown in Table 1 or 2 (i.e., vapor grown carbon fiber, and graphitic particles and/or amorphous carbon particles). A patterned film for evaluation was formed from the paste through printing, and then dried and cured. The volume resistivity of the resultant film was measured.

TABLE 1

| | | Amount (mass %) (on the basis of dried and cured paste) | | | | | | | | |
|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 |
| Carbon fiber | VGCF(150) | 10 | | | 10 | 10 | | | | |
| | VGCF-B(150) | | 10 | | | | 10 | 20 | 30 | 45 |
| | VGCF-B(80) | | | 10 | | | | | | |
| Carbon black | CB(K) | 10 | 10 | 10 | | | | 5 | 5 | |
| | CB-H(K) | | | | 10 | | | | | |
| | CB-B(K) | | | | | 10 | 10 | | | 10 |
| Graphite | UFG10 | 20 | 20 | 20 | 20 | 20 | | | | |
| | UFG10-B | | | | | | 20 | | | |
| Evaluation | Volume resistivity Ωcm | 0.6 | 0.4 | 0.3 | 0.5 | 0.4 | 0.3 | 0.4 | 0.1 | 0.015 |
| | Adhesiveness | ○ | ◎ | ◎ | ○ | ○ | ◎ | ◎ | ◎ | ○ |

TABLE 2

| | | Amount (mass %) (on the basis of dried and cured paste) | | | | | | | |
|---|---|---|---|---|---|---|---|---|---|
| | | Ex. 10 | Ex. 11 | Ex. 12 | Comp. Ex. 1 | Comp. Ex. 2 | Comp. Ex. 3 | Comp. Ex. 4 | Comp. Ex. 5 |
| Carbon fiber | VGCF(150) | | | | | | | 45 | |
| | VGCF-B(150) | 45 | 45 | 45 | | | | | 45 |
| | VGCF-B(80) | | | | | | | | |
| Carbon black | CB(K) | 10 | | | | 10 | 10 | | |
| | CB-H(K) | | | | | | | | |
| | CB-B(K) | | | | | | | | |
| Graphite | UFG10 | | 10 | | 20 | 20 | | | |
| | UFG10-B | | | 10 | | | | | |

TABLE 2-continued

| | | Amount (mass %) (on the basis of dried and cured paste) | | | | | | | |
|---|---|---|---|---|---|---|---|---|---|
| | | Ex. 10 | Ex. 11 | Ex. 12 | Comp. Ex. 1 | Comp. Ex. 2 | Comp. Ex. 3 | Comp. Ex. 4 | Comp. Ex. 5 |
| Evaluation | Volume resistivity Ωcm | 0.025 | 0.04 | 0.03 | 2 | 1 | 1.2 | 0.3 | 0.08 |
| | Adhesiveness | ○ | Δ | Δ | X | X | X | Δ | Δ |

INDUSTRIAL APPLICABILITY

According to the present invention, an electrically conductive product (e.g., a coating film) is obtained, which exhibits enhanced electrical conductivity, oxidation resistance, long-term stability and tribological characteristics, and lowered resistance anisotropy, by providing an electrically conductive coating material or an electrically conductive adhesive, which contains, as an electrically conductive material, a mixture of vapor grown carbon fiber, graphitic particles and amorphous carbon particles, or a mixture of vapor grown carbon fiber containing boron in an amount of 0.01 to 5 mass %, and graphitic particles or amorphous carbon particles.

The invention claimed is:

1. A carbonaceous material for forming an electrically conductive composition, comprising a vapor grown carbon fiber, each fiber filament of the carbon fiber containing a hollow space along the filament in its interior and having a multi-layer structure, an outer diameter of 2 to 500 nm and an aspect ratio of 10 to 15,000, graphitic particles that contain boron and amorphous carbon particles, wherein the amount of the vapor grown carbon fiber is 10 to 90 mass %, the amount of the graphitic particles is 3 to 65 mass %, and the amount of the amorphous carbon particles is 7 to 35 mass %.

2. The carbonaceous material for forming an electrically conductive composition according to claim 1, wherein the vapor grown carbon fiber is the carbon fiber containing boron in an amount of 0.01 to 5 mass %, and the amount of the carbon fiber in the carbonaceous material is at least 20 mass %.

3. The carbonaceous material for forming an electrically conductive composition according to claim 1, wherein the vapor grown carbon fiber contains a branched, vapor grown carbon fiber.

4. The carbonaceous material for forming an electrically conductive composition according to claim 1, wherein the vapor grown carbon fiber contains a nodular, vapor grown carbon fiber.

5. The carbonaceous material for forming an electrically conductive composition according to claim 1, wherein the graphitic particles or the amorphous carbon particles have an average particle size of 0.1 to 100 μm.

6. The carbonaceous material for forming an electrically conductive composition according to claim 1, wherein the graphitic particles or the amorphous carbon particles have been thermally treated at 2,000° C. or higher.

7. The carbonaceous material for forming an electrically conductive composition according to claim 1, wherein the amorphous carbon particles contain boron.

8. The carbonaceous material for forming an electrically conductive composition according to claim 1, wherein the amorphous carbon particles are formed of carbon black or glassy carbon.

9. The carbonaceous material for forming an electrically conductive composition according to claim 8, wherein the carbon black is at least one species selected from the group consisting of oil furnace black, gas black, acetylene black, lamp black, thermal black and channel black.

10. The electrically conductive composition comprising an carbonaceous material as recited in claim 1 and a resin component serving as a binder or a matrix material, and, if desired, a solvent.

11. The electrically conductive composition according to claim 10, wherein, when "a mass %", "b mass %" and "c mass %" represent the amounts of the vapor grown carbon fiber, the graphitic particles and the amorphous carbon particles contained in the composition, with the proviso that the solvent being excluded from the composition, respectively, a, b and c satisfy the following:

$$5 \leq a+b+c \leq 80.$$

12. A method for producing an electrically conductive composition characterized by adding a resin component and, if desired, a solvent to the carbonaceous material for forming an electrically conductive composition as recited in claim 1, and kneading the resultant mixture.

13. An electrically conductive coating material characterized by comprising, as an electrically conductive material, an electrically conductive composition as recited in claim 10.

14. The electrically conductive coating material according to claim 13, which is employed as an electrically conductive paste.

15. An electrically conductive adhesive characterized by comprising an electrically conductive composition as recited in claim 10.

16. An electrically conductive coating film characterized by being formed by use of an electrically conductive coating material as recited in claim 15.

17. An electronic part characterized by being formed by use of an electrically conductive coating material as recited in claim 13.

18. The carbonaceous material for forming an electrically conductive composition according to claim 7, wherein the amorphous carbon particles are formed of carbon black or glassy carbon.

19. The carbonaceous material for forming an electrically conductive composition according to claim 18, wherein the carbon black is at least one species selected from the group consisting of oil furnace black, gas black, acetylene black, lamp black, thermal black and channel black.

20. An electronic part characterized by being formed by use of an electrically conductive adhesive as recited in claim 15.

* * * * *